United States Patent
Zeng et al.

(10) Patent No.: US 12,432,645 B2
(45) Date of Patent: Sep. 30, 2025

(54) INFORMATION PROCESSING METHOD AND ELECTRONIC DEVICE

(71) Applicant: GUANGDONG OPPO MOBILE TELECOMMUNICATIONS CORP., LTD., Guangdong (CN)

(72) Inventors: Chunliang Zeng, Guangdong (CN); Zhaoxuan Zhai, Guangdong (CN); Zhigang Yu, Guangdong (CN); Taiyue Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 320 days.

(21) Appl. No.: 18/365,750

(22) Filed: Aug. 4, 2023

(65) Prior Publication Data
US 2023/0379800 A1   Nov. 23, 2023

Related U.S. Application Data

(63) Continuation of application No. PCT/CN2022/074307, filed on Jan. 27, 2022.

(30) Foreign Application Priority Data

Feb. 5, 2021   (CN) .......................... 202110163945.5

(51) Int. Cl.
  *H04W 48/10*   (2009.01)
  *H04W 8/00*   (2009.01)
(52) U.S. Cl.
  CPC ........... *H04W 48/10* (2013.01); *H04W 8/005* (2013.01)

(58) Field of Classification Search
None
See application file for complete search history.

(56) References Cited

U.S. PATENT DOCUMENTS

| | | |
|---|---|---|
| 2016/0119859 A1 | 4/2016 | Liu |
| 2016/0249287 A1 | 8/2016 | Xie et al. |
| 2018/0054845 A1* | 2/2018 | Lee ........................ H04W 48/14 |

(Continued)

FOREIGN PATENT DOCUMENTS

| | | |
|---|---|---|
| CN | 103607751 A | 2/2014 |
| CN | 106254189 A | 12/2016 |

(Continued)

OTHER PUBLICATIONS

Rejection decision in the corresponding Chinese Application No. 202110163945.5 mailed May 15, 2024.

(Continued)

*Primary Examiner* — Robert M Morlan
(74) *Attorney, Agent, or Firm* — Ladas & Parry, LLP

(57) ABSTRACT

The present application relates to an information processing method and an electronic device. The method includes: broadcasting a first management frame, wherein the first management frame is configured for discovering a second device failing to access a network; and receiving a second management frame sent by the second device. The second management frame is configured for indicating that the second device requests networking information of a target network. The networking information is configured for the second device to use to access the target network.

20 Claims, 6 Drawing Sheets receiving the first management frame broadcast by the first device, in response to the second device satisfying the preset condition — S701 sending the second management frame to the first device — S702

(56) References Cited

U.S. PATENT DOCUMENTS

| | | | |
|---|---|---|---|
| 2018/0199265 A1 | 7/2018 | Liu et al. | |
| 2023/0254203 A1* | 8/2023 | Tenkod | H04W 12/02 370/338 |
| 2024/0365293 A1* | 10/2024 | Sahoo | H04W 84/12 |

FOREIGN PATENT DOCUMENTS

| | | | |
|---|---|---|---|
| CN | 106302415 | A | 1/2017 |
| CN | 106507346 | A | 3/2017 |
| CN | 106535288 | A | 3/2017 |
| CN | 106571985 | A | 4/2017 |
| CN | 109246797 | A | 1/2019 |
| CN | 110856272 | A | 2/2020 |
| CN | 110995665 | A | 4/2020 |
| CN | 111132137 | A | 5/2020 |
| CN | 111357307 | A | 6/2020 |
| CN | 111757356 | A | 10/2020 |
| CN | 112188486 | A | 1/2021 |
| CN | 112202770 | A | 1/2021 |
| WO | 2009115991 | A1 | 9/2009 |
| WO | 2018219125 | A1 | 12/2018 |
| WO | 2019051647 | A1 | 3/2019 |

OTHER PUBLICATIONS

European Search Report in the corresponding European Application No. 22749034.9, mailed Jun. 28, 2024.

Chinese Third Office Action, Chinese Application No. 202110163945.5, mailed Dec. 28, 2023 (30 pages).

Chinese Fourth Office Action, Chinese Application No. 202110163945.5, mailed Mar. 8, 2024 (34 pages).

Chinese Review Decision Letter, Chinese patent Application No. 202110163945.5, mailed Sep. 30, 2024.

Chinese Notification to Grant Patent Right for Invention, Chinese Application No. 202110163945.5, mailed Nov. 4, 2024.

Chinese First Office Action and search report from the corresponding Chinese Application No. 202110163945.5, mailed Dec. 19, 2022.

Chinese Second Office action from the corresponding Chinese Application No. 202110163945.5, mailed Jul. 29, 2023.

International search report from International Application No. PCT/CN2022/074307, mailed Apr. 15, 2022.

Written Opinion of International Searching Authority in International Application No. PCT/CN2022/074307, mailed on Apr. 15, 2022 with English translation provided by WIPO.

* cited by examiner

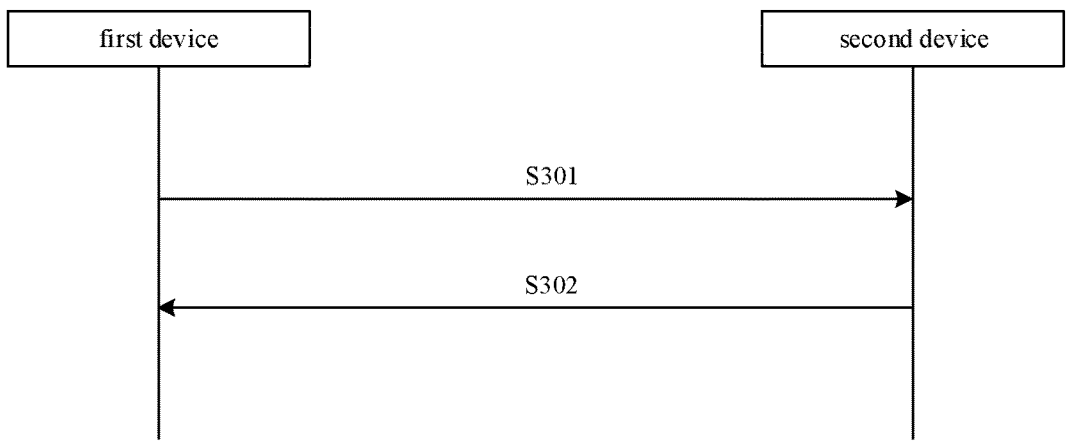
Fig. 3
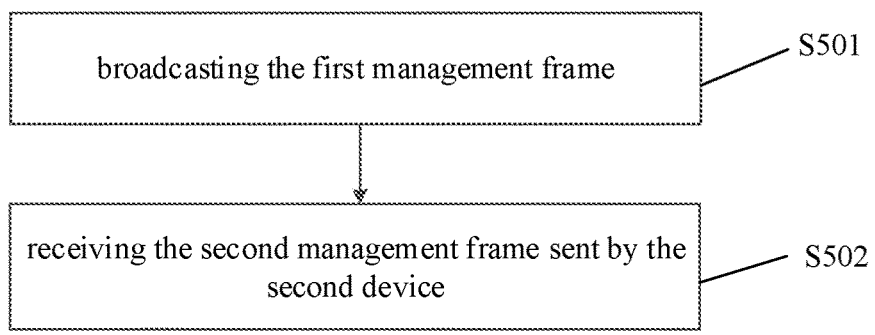
Fig. 4
Fig. 5
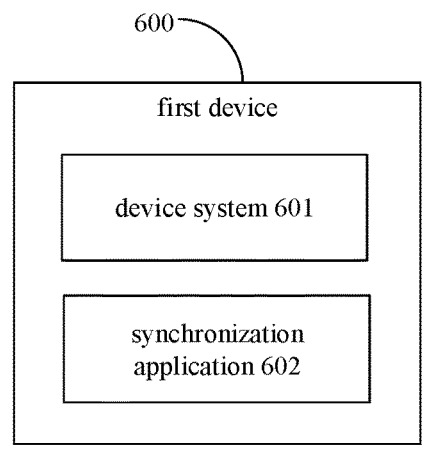
Fig. 6

INFORMATION PROCESSING METHOD AND ELECTRONIC DEVICE

CROSS REFERENCE TO RELATED APPLICATIONS

The present application is a continuation of International PCT Patent Application No. PCT/CN2022/074307 filed Jan. 27, 2022, which claims the priority of the Chinese Patent Application No. 202110163945.5, filed Feb. 5, 2021, both of which are herein incorporated by reference in their entireties.

TECHNICAL FIELD

The present application relates the field of mobile communication technologies, in particular to an information processing method and an electronic device.

BACKGROUND

With the flourish of intelligence hardware, more and more electronic devices have entered into people's life, especially with the usage of networks such as Wi-Fi networks, a great impact has been imposed on people's network life. Electronic devices need to access the network through networking information such as a network identifier and a password, but the configuration of the networking information needs to be configured manually, which requires the user to be able to know which device expects to be connected to the network, and the user must know the networking information of the network. The whole operation process is tedious and heavily dependent on the user, making the user experience unfavorable.

SUMMARY OF THE DISCLOSURE

According to a first aspect, an information processing method performed by a first device is provided according to embodiments of the present application. The method includes: broadcasting a first management frame, wherein the first management frame is configured to discover a second device failing to access a network; and receiving a second management frame sent by the second device. The second management frame is configured to indicate that the second device requests networking information of a target network. The networking information is configured for the second device to use to access the target network.

According to a second aspect, an information processing method performed by a second device is provided according to embodiments of the present application. The method includes: receiving, in response to the second device satisfying a first condition, a first management frame broadcasted by a first device, wherein, the first management frame is configured for discovering the second device failing to access a network, the second device satisfying the first condition represents that the second device has failed to access a target network; and sending a second management frame to the first device. The second management frame is configured to indicate that the second device requests networking information of the target network. The networking information is configured for the second device to use to access the target network.

According to a third aspect, an electronic device is provided according to embodiments of the present application. The electronic device includes a memory, a processor and a computer program stored on the memory and executable on the processor. In response to the electronic device being a first device, when executing the computer program, the processor implements the operations in the information processing method including: broadcasting a first management frame, wherein the first management frame is configured to discover a second device failing to access a network; and receiving a second management frame sent by the second device, wherein the second management frame is configured to indicate that the second device requests networking information of a target network, the networking information is configured for the second device to use to access the target network. Or in response to the electronic device being a second device, when executing the computer program, the processor implements the operations in the information processing method including: receiving, in response to the second device satisfying a first condition, a first management frame broadcasted by a first device, wherein, the first management frame is configured for discovering the second device failing to access a network, the second device satisfying the first condition represents that the second device has failed to access the network; and sending a second management frame to the first device, wherein, the second management frame is configured to indicate that the second device requests networking information of a target network, the networking information is configured for the second device to use to access the target network.

BRIEF DESCRIPTION OF THE DRAWINGS

FIG. 3 is an optional schematic flowchart of an information processing method provided according to an embodiment of the present application.

FIG. 4 is a schematic diagram of an optional format of layer 2 information provided according to an embodiment of the present application.

FIG. 5 is an optional schematic flowchart of an information processing method provided according to an embodiment of the present application.

FIG. 6 is a schematic diagram of an optional structure of a first electronic device provided according to an embodiment of the present application.

DETAILED DESCRIPTION

In order to clarify the purposes, technical solutions and advantages of the present application, the following will be described in further detail in conjunction with the accompanying drawings. The described embodiments should not be construed as a limitation to the present application. All other embodiments obtained by a person of ordinary skill in the art without creative efforts would fall within the protection scope of the present application.

Embodiments of the present application may be provided as an information processing method, a device and a storage medium. In practice, the information processing method may be implemented by the information processing apparatus, and various functional entities in the information processing apparatus may be cooperatively implemented by hardware resources of computer devices (such as household appliances and mobile terminals), such as computing resources like processors, communication resources (such as those configured to support the implementation of various ways of communication such as fiber optic cable and cellular).

Of course, embodiments of the present application are not limited to being provided as methods and hardware, but may also be implemented in a variety of ways, such as being provided as a storage medium (with instructions for executing the information processing method provided by embodiments of the present application).

Figure 1:
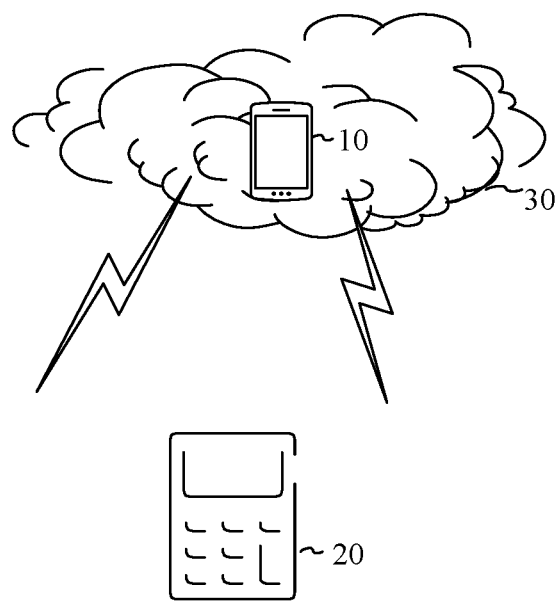
FIG. 1 is a schematic diagram of an optional architecture of an information processing system provided according to an embodiment of the present application.
Figure 2:
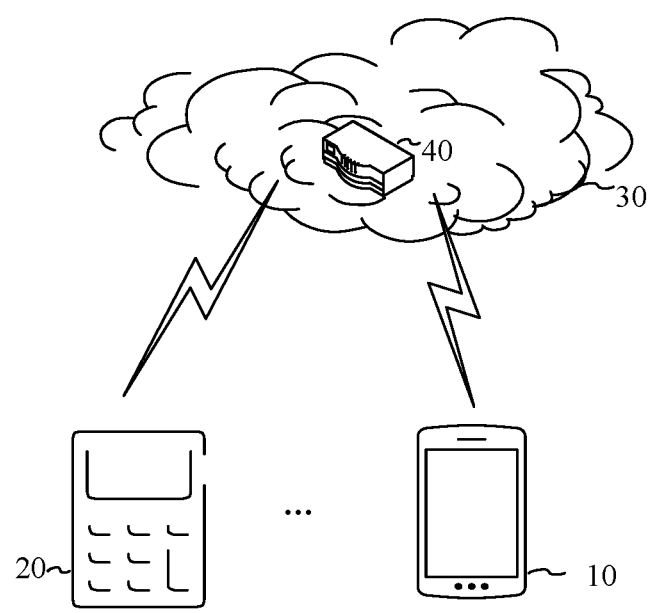
FIG. 2 is a schematic diagram of an optional architecture of an information processing system provided according to an embodiment of the present application.

The information processing method provided by embodiments of the present application may be performed by the information processing system illustrated in FIG. 1 or FIG. 2. As illustrated in FIG. 1 or FIG. 2, the information processing system includes a first device 10 and a second device 20. The first device 10 is an electronic device such as a mobile terminal, an AR device, a laptop, etc. The second device 20 is an electronic device such as a mobile terminal, an AR device, a laptop, a smart air conditioner, a smart humidifier, a smart weight meter, a smart washing machine, a Wi-Fi-type printer, etc.

The first device 10 broadcasts a first management frame. The first management frame is configured to discover the second device failing to access the network. Upon satisfaction of a first condition, the second device 20 receives the first management frame broadcasted by the first device 10 and sends a second management frame to the first device 10. The first device 10 receives the second management frame sent by the second device. The second management frame is configured to indicate that the second device requests networking information of a target network. The networking information is configured to enable the second device to access the target network. In an example, the first device 10 includes a wireless communication module. The wireless communication module of the first device 10 is configured to transmit a wireless signal that constitutes the target network 30. At this point, the first device 10 is an access point for the target network 30.

In an example, as illustrated in FIG. 2, the information processing system further includes a third device 40. The third device 40 is configured to transmit a wireless signal that constitutes the target network 30. At this point, the third device 40 is an access point for the target network 30.

Here, the target network 30 may be a Wi-Fi network.

In the information processing system illustrated in FIG. 2, the network accessed by the first device 10 may be the target network 30, then the first device 10 is accessed to the target network 30. At this point, the first device is configured with networking information of the target network 30.

In the information processing system illustrated in FIG. 2, the network accessed by the first device 10 may be a network other than the target network 30. The first device is not accessed to the target network 30, but is configured with the networking information of the target network 30.

In embodiments of the present application, the networking information of the network 30 in the first device 10 may be the network configuration for access, or it may be received by the user's input operation on the input device. The input device may include a touch screen, a keyboard, a writing pad, etc.

In practice, the second device in the information system illustrated in FIG. 1 or FIG. 2 is a device other than the first device, and the information system may include a plurality of second devices.

In conjunction with the above-mentioned information processing system, the present embodiment proposes an information processing method that is capable of reducing the user-participation level in the process of accessing the network by electronic devices.

In the following, various embodiments of the information processing method, the device, and the storage medium provided by embodiments of the present application are described in conjunction with the schematic diagram of the information processing system illustrated in FIG. 1 or FIG. 2.

An information processing method is provided according to an embodiment of the present application. The method may include operations at blocks illustrated in FIG. 3.

At block S301: broadcasting, by the first device, the first management frame.

The first device broadcasts the first management frame. The first management frame is configured to discover the second device failing to access the network. The first management frame may carry a network identifier of the target network, to indicate and discover a second device failing to connect to the target network.

The channels over which the first management frame is broadcasted by the first device include at least two channels. In one example, when the first management frame is configured to discover a device failing to connect to the Wi-Fi network, then the channels used for the broadcast of the first management frame include the 13 channels supported by the Wi-Fi network. In one example, the channel used for the broadcast of the first management frame includes a predefined channel.

When the second device satisfies the first condition, the second device receives the first management frame. In embodiments of the present application, the device in the information processing system that satisfies the first condition and receives the first management frame is referred to as the second device. One or more second devices may receive the first management frame when the first device has broadcast the first management frame.

Here, when the second device satisfies the first condition, the second device enters a setting mode to listen to the first management frame and waits for a reception of the first management frame.

When an electronic device in the information processing system does not satisfy the first condition, it does not enter the setting mode of waiting for the first management frame. When the electronic device detects the first management frame broadcasted by the first device, it blocks the reception of the first management frame.

The second device satisfies the first condition represents that the second device fails to access the network. Alternatively, the second device satisfies the first condition represents that the second device fails to access the target network.

In some embodiments, the first condition includes: the second device failing to access the network, and the failure being due to one of the following failure reasons: reason one, the network being not scanned; and reason two, the networking information used for accessing the network being wrong.

In embodiments of the present application, when the second device fails to access the network, a failure identifier is configured and a value of the failure identifier is configured in accordance with the failure reason. In an example, when the failure reason is reason one, the failure identifier is configured with a first value, when the failure reason is reason two, the failure identifier is configured with a second value, and when the failure reason is a condition other than the above-mentioned reasons, the failure identifier is configured with a value other than the first value and the second value.

The second device determines whether the second device satisfies the first condition by judging the failure reason identifier.

For example, if the failure reason that the second device fails to access the target network is reason one, and the network identifier of the target network is not available in the second device, then the target network has not been scanned. The network identifier may be a service set identifier (SSID).

Here, the second device receives the first management frame on the first channel. The first channel over which the first management frame is received may be different for different second devices.

In embodiments of the present application, the second device performs reception of the first management frame broadcasted by the first device while in a state of wait-to-be-discovered. The second device may enter the wait-to-be-discovered state in an event of trying to access the target wireless network but failing. While in the wait-to-be-discovered state, the second device scans the channel to detect the first management frame.

At block S302, sending, by the second device, a second management frame to the first device.

Upon receipt of the first management frame, the second device sends the second management frame to the first device, and the first device receives the second management frame sent from the second device. The second management frame indicates that the second device requests networking information of the network. The networking information is configured for the second device to use to access the target network. In embodiments of the present application, the first device, after broadcasting the first management frame, may receive the second management frame sent by one or more second devices.

Hereby, the second device notifies, through the second management frame, the first device that a synchronization of the networking information of the target network is needed, in order to access the target network.

In some embodiments, the first device interacts with the second device via n management frames. At least one of the n management frames includes a customized field. The n is a positive integer.

The first management frame is a management frame of the at least one management frame and is broadcasted by the first device.

In some embodiments, the second management frame is a management frame of the at least one management frame and is sent from the second device to the first device.

Alternatively, a format of the management frame may adopt the universal format of 802.11.

In some embodiments, the customized field includes at least one information element. A first information element of the at least one information element includes at least one of the following sub-fields: a tag number sub-field configured to identify the customized field; a length sub-field configured to identify the length of the first information element; an organizationally unique identifier sub-field configured to identify a format standard of the first information element; and a data sub-field configured to describe content information of the layer 2 information; a data-type sub-field configured to identify a type of the layer 2 information.

In one example, the format of the first information element is as illustrated in FIG. 4, including: the tag number sub-field, the length sub-field, the organizationally unique identifier sub-field, the data-type sub-field and the data sub-field. The tag number sub-field may be expressed as Tag Number, which is a customized value. In one example, Tag Number is 221. The length sub-field may be expressed as length, which indicates the length of the layer 2 information. The organizationally unique identifier sub-field may be expressed as Organizationally unique identifier (OUI), which is configured to identify the format standard of the information element. In one example, OUI takes the value of 0xFCA5D0. The data-type sub-field can be expressed as Type, which denotes the type of the layer 2 information. The data sub-field can be expressed as DATA.

Alternatively, the type of the layer 2 information includes: a device discovery request, a synchronization request and a synchronization answer.

Alternatively, the type of the layer 2 information carried in the first management frame is the device discovery request.

Alternatively, the type of the layer 2 information carried in the second management frame is the synchronization request.

Alternatively, the type of the layer 2 information carried in a third management frame is the synchronization answer.

Alternatively, different devices recognize the format standard adopted by the first information element through the OUI, in order to determine whether they themselves support parsing of the received first information element.

The customized field may include one or more first information element.

Take the case where the customized field includes a plurality of first information elements as an example, the data needing to be sent is carried in the data sub-fields of the plurality of first information elements, and the data-type sub-fields of the plurality of first information elements have a same value. At this point, the contents of numeric sub-fields of the first information elements of which the values of the plurality of data-type sub-fields in the customized fields are identical are stitched or concatenated, to obtain a complete data.

Alternatively, the customized fields of the management frame may further include a second information element other than the first information element, and the format of and the content carried in the second information element may be set per requirement.

In some embodiments, the layer 2 information carried in the first management frame is the device discovery request. The type of the first management frame includes: an action frame or a probe frame. The value of the data-type sub-field corresponding to the device discovery request is a first value. The data sub-field corresponding to the device discovery request carries capability information of the first device.

In embodiments of the present application, the layer 2 information pieces are carried in the management frame. When the data-type sub-field carried in the first management frame is a first value, the management frame is the first management frame. The customized data field in the first management frame is configured for device discovery, and the layer 2 information is the device discovery request.

The first management frame includes: the probe frame or the action frame.

Take the case in which the first management frame is the probe frame as an example, the first management frame is carried in a probe request.

Take the case in which the first management frame is the action frame as an example, the first management frame is carried in an action request.

In some embodiments, the capability information of the first device is carried in the data sub-field of the device discovery request.

In some embodiments, the capability information of the first device includes: a first capability information for describing a network-configure capability or a password-synchronization capability of the first device.

In an example, the capability information of the first device includes: a network-configure capability indication information and a password-synchronization capability indication information. The network-configure capability indication information is configured to describe the network-configure capability of the first device. The password-synchronization capability indication information is configured to describe the password-synchronization capability of the first device.

Alternatively, the capability information of the first device further includes: a default capability information. The default capability information is configured to describe that, the first device lacks the network-configure capability and the password-synchronization capability.

In some embodiments, the layer 2 information carried in the second management frame is a synchronization request. The type of the second management frame includes: the action frame or the probe frame. The value of the data-type sub-field corresponding to the synchronization request is the second value. The data sub-field corresponding to the synchronization request carries the family information of the second device.

When the data-type sub-field of the management frame takes the second value, the management frame is the second management frame, and the layer 2 information in the customized field of the management frame is the synchronization request. The synchronization request is configured to indicate that the second device requests the networking information of the target network. Alternatively, the networking information includes an SSID or a password. When the networking information includes the password, the synchronization request is a device password-synchronization request. When the networking information includes an SSID, the synchronization request is a device network identifier synchronization request.

In some embodiments, the second management frame includes: the probe frame or the action frame.

Take a case in which the second management frame is the probe frame as an example, the second management frame is carried in the probe response.

Take a case in which the second management frame is the action frame as an example, the second management frame is carried in the action response.

In some embodiments, the family information of the second device is carried in the data sub-field of the synchronization request.

Alternatively, the family information of the second device includes at least one of the following information: a family group identifier, a family certificate, a public key and a signature. In some embodiments, the channel over which the second management frame is sent by the second device is the first channel. At this point, the channel over which the second management frame is received by the first device is the first channel. The first channel is the channel that is used by the second device to receive the first management frame.

Based on the information processing method illustrated in FIG. 3, an information processing method performed by the first device includes operations at blocks illustrated in FIG. 5.

At block S501: broadcasting the first management frame.

The first management frame is configured for discovering the second device failing to access the network.

At block S502: receiving the second management frame sent by the second device.

The second device is a device that has failed to access the network. The second management frame is configured to indicate that, the second device requests the networking information of the target network. The networking information is configured to enable the second device to access the target network.

In a practical application, as illustrated in FIG. 6, the first device 600 includes a device system 601 and a password synchronization application program 602. The password synchronization application program 602 receives a device discovery operation of a user to generate a device probe indicator. The password synchronization application program 602 may select, based on the user's device discovery operation, a network identifier of a network as the network identifier of the target network. The password synchronization application program 602 sends the device probe indicator to the device system 601, to instruct the device system 601 to broadcast the first management frame.

Figure 7:
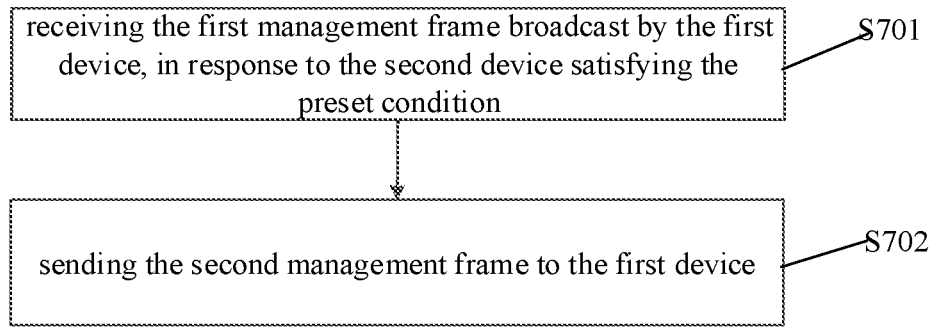
FIG. 7 is an optional schematic flowchart of an information processing method provided according to an embodiment of the present application.

Based on the information processing method illustrated in FIG. 3, an information processing method performed by the second device includes operations at blocks illustrated in FIG. 7.

At block S701: receiving, in response to the second device satisfying the first condition, the first management frame broadcasted by the first device.

The first management frame is configured for discovering the second device failing to access the network. The second device satisfying the first condition represents that the second device has failed to connect to the target network.

At block S702: sending the second management frame to the first device.

The second management frame is configured for indicating that, the second device requests the networking information of the target network. The networking information is configured for the second device to use to access the target network.

The information processing method provided in embodiments of the present application includes: the first device broadcasts the first management frame, the first management frame is configured for discovering devices failing to connect to the target network to be accessed; the second device receives the first management frame broadcasted by the first device in response to the second device satisfying the first condition; the second device sends the second management frame to the first device in response to the second device satisfying the first condition; the first device receives the second management frame sent from the second device, the second device is a device failing to connect to the target access network. The second management frame is configured to indicate that, the second device is requesting to synchronize the networking information of the network. In this way, through the broadcast of the first management frame and the reception of the second management frame, the second device that expects to connect to the target network but fails to connect to the target network is automatically discovered when the first device and the second device are not connected, thereby allowing synchronization of the networking information. It is not necessary for the user to automatically determine the second device currently to be accessed to the target network, nor is it necessary for the user to know the networking information of the target network, thereby reducing dependence of the second device on the user throughout the entire process of accessing the target network, and at the same time, enabling password synchronization in non-connection scenarios, and enabling the second device to be automatically accessed to the target network.

Figure 8:
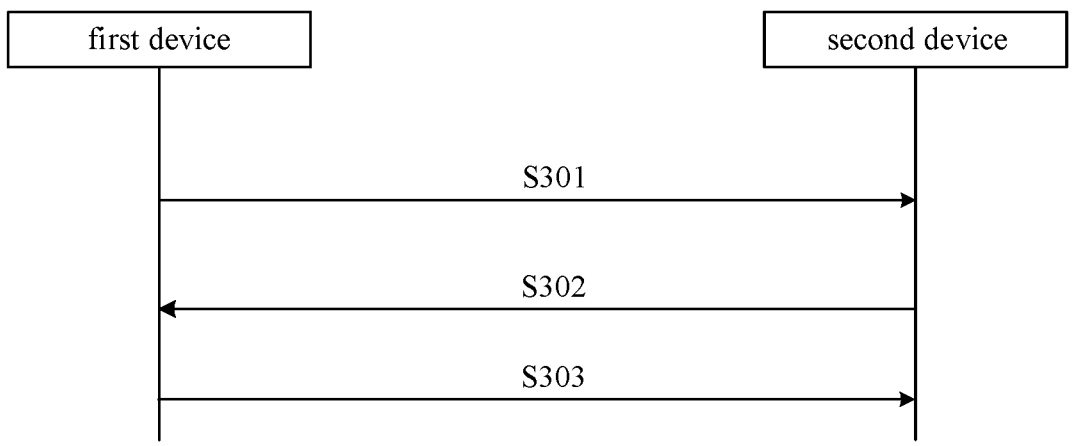
FIG. 8 is an optional schematic flowchart of an information processing method provided according to an embodiment of the present application.

In some embodiments, as illustrated in FIG. 8, after the operation at block S302, the method further includes the following operations.

At block S303: the first device broadcasts the third management frame.

The first device broadcasts the third management frame to the second device. At this point, the second device receives the third management frame broadcasted by the first device. The networking information of the target network is carried in a customized field of the third management frame. The third management frame is one of the at least one management frame and is broadcasted by the first device.

Alternatively, the networking information of the target network is carried in the data sub-field in the customized field of the third management frame.

Alternatively, the family information of the first device is also carried in the customized field of the third management frame.

Alternatively, the family information of the first device includes at least one of the following information of the first device: the family group identifier, the family certificate, the public key, and the signature.

In some embodiments, the channel over which the first device broadcasts the third management frame is the second channel. The second channel is an operating channel of the target network. A channel indication information is carried in the data sub-field in the customized field of the first management frame. The channel indication information is configured to indicate the second channel. At this point, the channel over which the second device receives the third management frame is the second channel.

In one example, the first device or the second device assigns a channel indicated by the channel indication information as the second channel.

In one example, a plurality of channels are preconfigured in the first device or the second device. The second channel is selected by the first device or the second device from the preconfigured plurality of channels based on the channel indication information.

After sending the second management frame, the second device switches the operating channel to the second channel according to the channel indication information carried in the first management frame, to receive the third management frame broadcasted by the first device over the second channel. Upon receiving the second management frame, the first device switches the operating channel to the second channel, to broadcast the third management frame to the second device.

In some embodiments, the layer 2 information carried in the third management frame is a synchronization answer. The type of the third management frame includes: the action frame or the probe frame. The value of the data-type sub-field corresponding to the synchronization answer is a third value. The networking information of the target network is carried in the data sub-field corresponding to the synchronization answer.

When the data-type sub-field of the management frame takes the third value, the management frame is the third management frame, and the layer 2 information in the customized field of the management frame is the synchronization answer. The synchronization answer is configured to send the networking information of the target network. The networking information of the target network is carried in the data sub-field of the synchronization answer. Alternatively, the networking information includes the SSID or the password. When the networking information includes the password, the synchronization answer is a device password-synchronization answer. When the networking information includes the SSID, the synchronization request is a device network identifier synchronization answer.

In some embodiments, the third management frame includes: the probe frame or the action frame.

Take the case in which the third management frame is the probe frame as an example, the third management frame is carried in the probe request.

Take the case in which the third management frame is the action frame as an example, the third management frame is carried in the action request.

In embodiments of the present application, the customized field of the management frame includes at least one information element (IE). The at least one information element constitutes layer 2 information. The information element may include one or more of the following sub-fields: the tag number, the length, the organizationally unique identifier, the data, the data type etc. When the value of the data-type sub-field is different, the layer 2 information of the customized field is a different message. When the value of the data-type sub-field is the first value, the layer 2 information is the first layer 2 information: the device discovery request; when the value of the data-type sub-field is the second value, the layer 2 information is the second layer 2 information: the synchronization request; and when the value of the data-type sub-field is the third value, the layer 2 information is the third layer 2 information: the synchronization answer.

In some embodiments, the data sub-field in the customized field of the second management frame carries the family information of the second device. The family information of the second device is configured to be used by the first device to determine whether the second device is a valid user of the first family group. The first family group is the family group to which the first device belongs.

When the data sub-field in the customized field of the second management frame carries the family information of the second device, the first device, before implementing the operation at block S303, further performs the operation of: determining, based on the family information of the second device, whether the second device is the valid user of the first family group, the first family group is the family group to which the first device belongs.

Correspondingly, the implementation of the operation at block S303 includes: in response to the second device being the valid user of the first family group, broadcasting the third management frame.

Before the operation at block S303, the first device determines whether the family information of the second device is included in the second management frame, and in response to the family information of the second device being not carried in the second management frame, terminates a procedure; in response to the family information of the second device being carried in the second management frame, the family information of the second device is verified to determine whether the second device is the valid user of the first family group to which the first device belongs. The first device determines that the second device is the valid user of the first family group and broadcasts the third management frame to the second device.

In a practical application, upon receiving the second management frame sent by the second device, the device system of the first device sends the family information of the second device carried in the second management frame to the synchronization application program in the first device. The synchronization application program verifies the family information of the second device.

Hereby, upon receipt of the second management frame by the device system of the second device, the second management frame is parsed and the synchronization answer message is acquired, to determine that the second device needs to perform synchronization of the networking information of the target network.

In some embodiments, the data sub-field in the customized field of the third management frame carries the family information of the first device, and the family information of the first device is configured to be used by the second device, to determine whether the first device is the valid user of the second family group. The second family group is the family group to which the second device belongs.

When the data sub-field in the customized field of the third management frame carries the family information of the first device, after the operation at block S303, the second device further performs the following operations: determining, based on the family information of the first device, whether the first device is the valid user of the second family group. The second family group is the family group to which the second device belongs. In response to the first device being the valid user of the second family group, the target network is accessed through the networking information.

After the operation at block S303, the second device determines whether the family information of the first device is included in the third management frame, and in response to the family information of the first device not being carried in the third management frame, terminates the procedure; in response to the family information of the first device being carried in the third management frame, the family information of the first device is verified to determine whether the first device is the valid user of the second family group to which the second device belongs. In response to determining that the first device is the valid user of the second family group to which the second device belongs, the second device performs accessing of the target network based on the networking information carried in the third management frame. In response to determining that the first device is not the valid user of the second family group to which the second device belongs, the second device terminates the procedure.

Hereby, the family information of the first device may include the family certificate of the first device. The second device determines whether the first device is the valid user of the second family group through the verification of the family certificate of the first device.

In a practical application, the networking information carried in the third management frame is encrypted networking information. In response to determining that the first device is the valid user of the second family group, the second device is capable of generating a key through the public key of the first device and decrypting the encrypted networking information through the key. In embodiments of the present application, no limitation is imposed on encryption and decryption algorithms used for the encrypted networking information.

In embodiments of the present application, when the first device is the valid user of the second family group and the second device is the valid user of the first family group, the first family group and the second family group may be a same family group or different family groups.

In a practical application, upon verifying that the second device is the valid user of the first family group, the synchronization application program of the first device acquires a password in the networking information from the device system, generates a synchronization response based on the acquired password, self-stored network identifier and self-stored family information of the first device, sends the synchronization response to the device system, and indicates the device system to broadcast the third management frame.

In embodiments of the present application, the family information includes: the family group identifier or the family certificate, etc. that identifies whether the first device is the valid user of the second family group, or identifies whether the second device is the valid user of the first family group.

In embodiments of the present application, the family information of the first device or the family information of the second device is the family information input by the user or configured by a security device corresponding to the target network to the first device or the second device in case the first device or the second device is accessed to the target network.

The information processing method provided by embodiments of the present application can be applied in at least one of the following scenarios 1 and 2.

The Scenario 1

The device A has accessed the target Wi-Fi network, the device B does not have the networking information of the target Wi-Fi network and is unable to access the target Wi-Fi network. Then in the case that the device A broadcasts the first management frame, the device B detects the first management frame and sends the second management frame to the device A over the channel over which the first management frame is received. In the case that the device A receives the second management frame, the device A sends the third management frame to the device B over the channel over which the second management frame is received. The third management frame carries the networking information of the target Wi-Fi network, which enables the device B to access the target Wi-Fi network.

The Scenario 2

In this case, the device A and the device B have accessed the target Wi-Fi network, and are valid users of the same family group (family group 1). Each of the device A and the device B are configured with the family information of the family group 1 respectively. In the case that the password of the target Wi-Fi network is modified and the password in the device A has been modified synchronously, the password in the device B is wrong and the device B is unable to connect to the target Wi-Fi network. At this point, the device A broadcasts the first management frame, and in the case that the device B detects the first management frame, the second management frame carrying the family information of the device B is returned to the device A, to indicate that the password of the target Wi-Fi network needs to be synchronized. Upon receipt of the second management frame, the device A determines, by the family information of the device B, that the device B is the valid user of the family group 1, and then sends the third management frame to the device B. The third management frame carries the networking information of the target Wi-Fi network and the family information of the device A. Upon receipt of the third management frame, the device B determines, by the family information of the device A, that the device A is the valid user of the family group 1, and then accesses the target Wi-Fi network by the networking information of the target Wi-Fi network.

In the following, the information processing method provided by embodiments of the present application is further illustrated, taking the network being a Wi-Fi network as an example.

Figure 9:
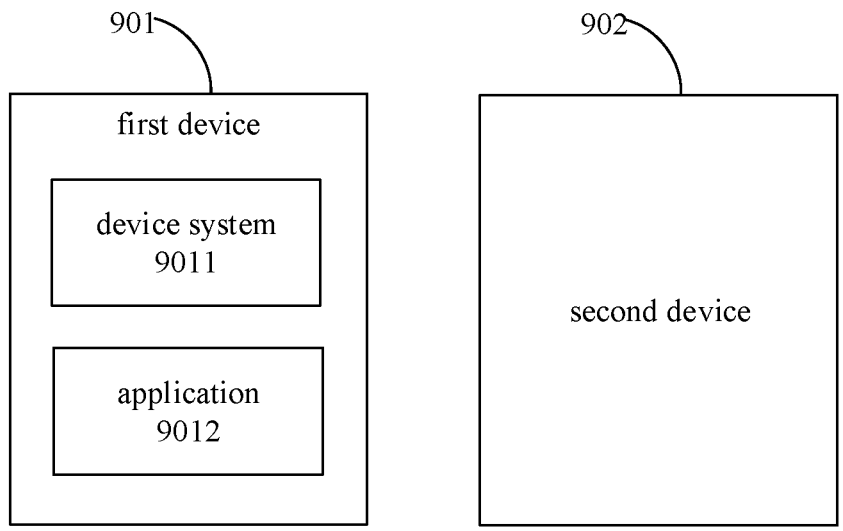
FIG. 9 is a schematic diagram of an optional structure of an information processing system provided according to an embodiment of the present application.

The information processing method provided by embodiments of the present application can be applied in the scenario illustrated in FIG. 9. As illustrated in FIG. 9, the first device 901 and the second device 902 are included. The first device 901 includes: a system 9011 and an application program 9012. The application program 9012 is the synchronization application program 602. The customized fields of the management frames interacted between the first device 901 and the second device 902 field carry the layer 2 information. The management frames may include: the probe frame and the action frame.

As illustrated in FIG. 5, the format of the information element of the layer 2 information includes: the tag number sub-field, the length sub-field, the organizationally unique identifier sub-field, the data-type sub-field and the data sub-field. The tag number sub-field may be expressed as Tag Number, which is a customized value. In one example, Tag Number is 221. The length sub-field may be expressed as length, which is the length of the layer 2 information. The organizationally unique identifier sub-field may be expressed as Organizationally unique identifier (OUI), which is configured to identify the information element. In one example, OUI takes the value of 0xFCA5D0. The data-type sub-field can be expressed as Type, which denotes the type of the layer 2 information. The data sub-field can be expressed as DATA. In one example, the definition of Type is illustrated in Table 1.

TABLE 1 definition examples of Type

| Type | Definition |
|---|---|
| 0 × 01 | device discovery request |
| 0 × 05 | device password-synchronization request |
| 0 × 06 | device password-synchronization answer |

Based on the definition of Type illustrated in Table 1, when the value of Type is 0x01, the layer 2 information is the device discovery request; when the value of Type is 0x05, the layer 2 information is the device password-synchronization request; and when the value of Type is 0x06, the layer 2 information is the device password-synchronization answer.

In a practical application, a plurality of pieces of layer 2 information may be carried in the messages interacted between the first device and the second device.

In embodiments of the present application, the formats of the plurality of pieces of layer 2 information and the definitions of the types in the formats are not limited in any way, and the user can set them according to actual requirements.

In embodiments of the present application, the layer 2 information may be carried in an interactive message that complies with a Wi-Fi protocol and is located in a Vendor Specific field in the Probe frame or the Action frame of the interactive message. The Vendor Specific field is a user-customized field.

When a single information element does not have enough space for the data that needs to be sent, the customized field of the management frame supports a plurality of information elements, and subsequent information elements continue to be filled with the remaining data from a position after the Type sub-field. The contents of the data sub-fields of all the information elements with the same Type sub-field are concatenated together in sequence and parsed as complete data.

Figure 10:
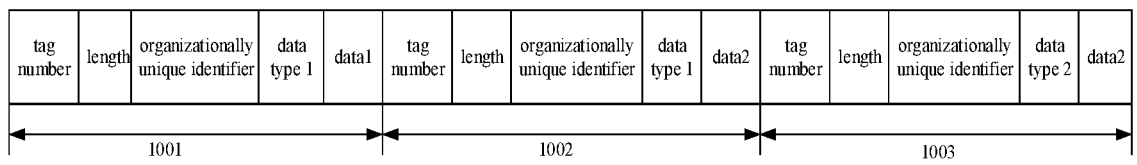
FIG. 10 is a schematic diagram of an optional format of layer 2 information provided according to an embodiment of the present application.

In an example, as illustrated in FIG. 10, values of the customized field of the management frame include: an information element 1001, an information element 1002 and an information element 1003. The data type of both the information element 1001 and the information element 1002 is data type 1, and the data type of the information element 1003 is data type 2. Then data 1 in the data sub-field of the information element 1001 and data 2 in the data sub-field of the information element 1002 are concatenated, and the completed data can be obtained.

Figure 11:
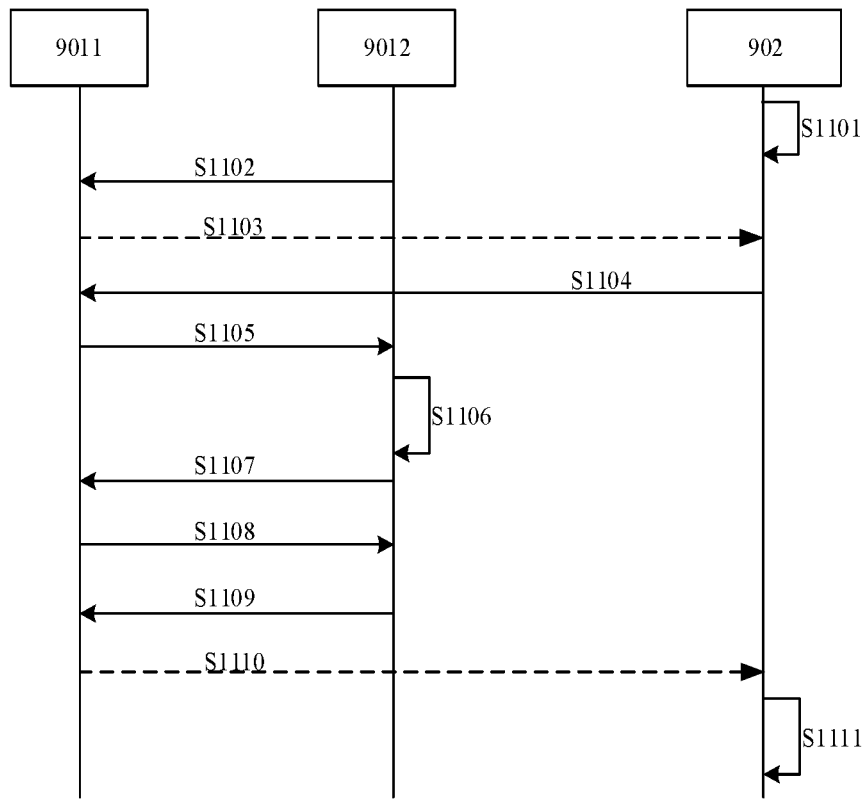
FIG. 11 is an optional schematic flowchart of an information processing method provided according to an embodiment of the present application.

The interaction between the first device 901 and the second device 902 includes the following operations as illustrated in FIG. 11.

At block S1101: the second device enters into a waiting state.

In the case that, the second device fails to connect to the target AP and the failure reason is that the second device cannot scan the target AP or the password is wrong, the second device enters into the waiting state, in order to wait to be discovered by other devices.

At block S1102: the application program of the first device sends a scan instruction to the system.

The application program generates the scan instruction based on the user's operation. The SSID of the target AP is carried in the scan instruction.

At block S1103: the system of the first device broadcasts, based on the scan instructions, the first management frame.

The system broadcasts the first management frame, i.e., the first probe request, in each channel. If the customized field in the first probe request includes an IE whose data-type sub-field type is 0x01, then the IE constitutes the layer 2 information: the device discovery request for discovering devices failing to connect to the target AP. The AP identifier of the target AP is also carried in the first management frame.

At block S1104: the second device sends the second management frame carrying the family information to the system.

Upon receipt of the first management frame broadcasted by the system, and when the type sub-field in the IE of the customized field of the management frame is 0x01, the second device sends, in response to the received first management frame, the second management frame in the channel over which the first management frame is received. In the customized field of the second management frame, the type sub-field in the IE is 0x05, then the IE constitutes the layer 2 information: password-synchronization request, configured to indicate that the current second device requires to synchronize the password of the target AP.

The family information is further carried in the second management frame. The family information includes: the family ID, the family address or the family certificate.

At block S1105: the system sends the password-synchronization request to the application program.

The system, upon receiving the second management frame, sends the password-synchronization request to the application program, to indicate that, the second device requests to perform the password synchronization, and the password-synchronization request carries the family information of the second device.

At block S1106: the application program verifies the received family information.

The application program verifies the family information of the second device, determines whether the second device and the first device are within the same family group. When the verification is successful, the application program considers the second device and the first device belong to the same family group, and executes the operation at block S1107. When the verification fails, the application program considers that the second device and the first device do not belong to the same family group, and terminates the procedure.

At block S1107: the application program sends a password acquisition request to the system.

At block S1108: the system returns the password of the target AP to the application program.

At block S1109: the application program sends a password-synchronized response to the system.

Hereby, the application program generates, based on the received password of the target AP and in response to the password-synchronization request sent by the system, the password-synchronization response.

The family Wi-Fi information is carried in the password-synchronization response, and the family Wi-Fi information includes: the network identifier and the password of the target AP.

At block S1110: The system broadcasts the third management frame.

Upon receipt of the password-synchronization response by the system, the family Wi-Fi information carried in the password-synchronization response is carried in the third management frame, and the system broadcasts the third management frame over a family Wi-Fi channel.

The customized field of the third management frame includes an IE whose type sub-field is 0x06. The IE constitutes the layer 2 information: the synchronization answer. The third management frame is configured for synchronizing the password of the target AP.

The third management frame further carries the family information of the first device.

In a practical application, the first device can encrypt the family Wi-Fi information through a key negotiation algorithm.

At block S1111: the second device connects to the target AP based on the third management frame.

Upon receipt of the third management frame through the family Wi-Fi channel, the second device accesses the target AP through the family Wi-Fi information carried in the third management frame. That is, the second device reconnects to the target AP.

When the family information of the first device is carried in the third management frame, the second device verifies the family information of the first device and determines whether the first device and the second device belong to the same family group. When the determination result is that the first device and the second device belong to the same family group, the target AP is accessed through the password of the target AP carried in the third management frame. When the determination result is that the first device and the second device do not belong to the same family group, the procedure is terminated.

When the first device encrypts the family Wi-Fi information through the key negotiation algorithm, the second device performs a decryption operation through the key negotiation algorithm to get the family Wi-Fi information.

It should be noted that, in the information processing method illustrated in FIG. 11, the first device 901 and the second device 902 are in the non-connected state or not connected to each other. In this case, the messages interacted between the first device 901 and the second device 902, i.e., the messages interacted between the device system 9011 and the second device 902, are based on the non-connected message interaction, and the interacted messages are represented by dashed lines.

In embodiments of the present application, when the second device fails to connect to the current Wi-Fi and the failure is due to not being able to scan a hot spot or the password is wrong, the second device enters the waiting for device discovery and probe state. The first device serving as a Provisioner performs a device discovery request by sending a Wi-Fi management frame, at which time if the second device is already in the state of failing to connect to the current Wi-Fi, then the second device responds with a request of requiring password synchronization. After the Provisioner has received the request of requiring password synchronization from the second device, the Provisioner first verifies the device family certificate of the second device, to confirm whether the second device belongs to the same family with itself. If the Provisioner and the second device belongs to the same family, then the Provisioner can initiate the password synchronization process, otherwise the procedure is terminated. The Provisioner sends the most updated AP information based on the modification of the Wi-Fi layer 2 protocol, and the content is encrypted securely based on the family certificate. After receiving the AP information, the second device first verifies the family certificate and confirms that the Provisioner and the second device belongs to the same family. If the Provisioner and the second device belongs to the same family, then the second device decrypts the AP information and reconnects to the AP, otherwise the procedure is terminated.

In embodiments of the present application, based on the safe interaction of the modified Wi-Fi underlying protocol, the automatic password synchronization of the device is achieved, which greatly enhances the user's experience.

The information processing method provided in embodiments of the present application has the following features.

1. It is applicable to a scenario in which the user changes the family Wi-Fi password, the device automatically listens to and triggers password synchronization, thus the network connection is automatically restored.
2. The concept of family Wi-Fi for the family group is introduced, such that when the device is disconnected from the Wi-Fi, the device having the networking information of the family Wi-Fi can automatically synchronize the networking information of the family Wi-Fi with the device, the user does not need to manually select the Wi-Fi synchronization for the device, thus a pleasant experience of zero user involvement is achieved.
3. When transmitting the networking information of the family Wi-Fi, the security and reliability of the password synchronization is ensured based on the family certificate security system.
4. The password synchronization with a plurality of devices is performed simultaneously through the synchronization of one package, which enhances the transmission efficiency.

Figure 12:
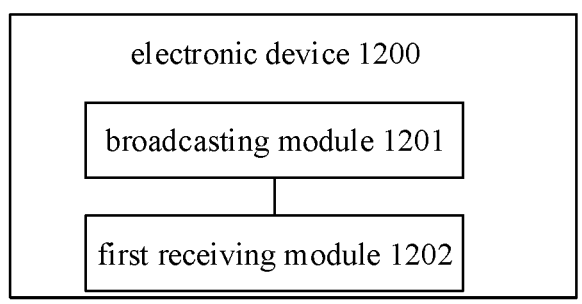
FIG. 12 is a schematic diagram of an optional structure of an electronic device provided according to an embodiment of the present application.

FIG. 12 is a schematic structural diagram of an electronic device serving as the first device according to an embodiment of the present application. As illustrated in FIG. 12, the electronic device 1200 includes a broadcasting module 1201 and a first receiving module 1202.

The broadcasting module 1201 is configured for broadcasting the first management frame. The first management frame is configured to discover the second device failing to access the network;

The first receiving module 1202 is configured for receiving the second management frame sent by the second device. The second management frame is configured to indicate that the second device requests the networking information of the target network. The networking information is configured for the second device to use to access the target network.

In some embodiments, the first device interacts with the second device via n management frames. At least one of the n management frames includes the customized field. The n is a positive integer.

The first management frame is the management frame of the at least one management frame and is broadcasted by the first device.

In some embodiments, the second management frame is the management frame of the at least one management frame and is sent from the second device to the first device.

In some embodiments, the customized field includes at least one information element. The first information element of the at least one information element includes at least one of the following sub-fields: the tag number sub-field configured to identify the customized field; the length sub-field configured to identify the length of the first information element; the organizationally unique identifier sub-field configured to identify the format standard of the first information element; and the data sub-field configured to describe the content information of the layer 2 information; and the data-type sub-field configured to identify the type of the layer 2 information.

In some embodiments, the layer 2 information carried in the first management frame is the device discovery request. The type of the first management frame includes: the action frame or the probe frame. The value of the data-type sub-field corresponding to the device discovery request is the first value. The data sub-field corresponding to the device discovery request carries the capability information of the first device.

In some embodiments, the capability information of the first device includes: the first capability information, configured for describing the network-configure capability or the password-synchronization capability of the first device.

In some embodiments, the layer 2 information carried in the second management frame is the synchronization request. The type of the second management frame includes: the action frame or the probe frame. The value of the data-type sub-field corresponding to the synchronization request is the second value, and the data sub-field corresponding to the synchronization request carries the family information of the second device.

In some embodiments, the channel over which the second management frame is received is the first channel. The first channel is the channel that is used by the second device to receive the first management frame.

In some embodiments, the broadcasting module 1201 is further configured for broadcasting the third management frame. The networking information of the target network is carried in the customized field of the third management frame. The third management frame is one of the at least one management frame and is broadcasted by the first device.

In some embodiments, the channel over which the third management frame is broadcast is the second channel. The second channel is the operating channel of the target network. The channel indication information is carried in the data sub-field in the customized field of the first management frame. The channel indication information is configured to indicate the second channel.

In some embodiments, the layer 2 information carried in the third management frame is the synchronization answer. The type of the third management frame includes: the action frame or the probe frame. The value of the data-type sub-field corresponding to the synchronization answer is the third value, and the data sub-field corresponding to the synchronization answer carries the networking information of the target network.

In some embodiments, the electronic device 1200 further includes a first verification module, which is configured for: when the data sub-field in the customized field of the second management frame carries the family information of the second device, before broadcasting the third management frame, determining, based on the family information of the second device, whether the second device is the valid user of the first family group. The first family group is the family group to which the first device belongs. Accordingly, the broadcasting module 1201 is further configured for broadcasting the third management frame in case that the second device is the valid user of the first family group.

In some embodiments, the data sub-field in the customized field of the third management frame carries the family information of the first device, and the family information of the first device is configured to be used by the second device to determine whether the first device is the valid user of the second family group. The second family group is the family group to which the second device belongs.

Figure 13:
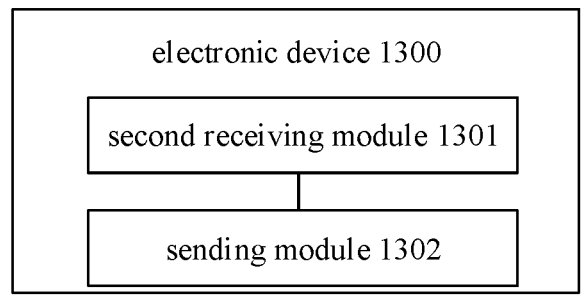
FIG. 13 is a schematic diagram of an optional structure of an electronic device provided according to an embodiment of the present application.

FIG. 13 is a schematic structural diagram of an electronic device serving as the second device according to an embodiment of the present application. As illustrated in FIG. 13, the electronic device 1300 includes a second receiving module 1301 and a sending module 1302.

The second receiving module 1301 is configured for receiving, in response to the second device satisfying the first condition, the first management frame broadcasted by the first device. The first management frame is configured for discovering the second device failing to access the network. The second device satisfying the first condition represents that the second device has failed to access the network.

The sending module 1302 is configured for sending the second management frame to the first device. The second management frame indicates that the second device requests the networking information of the target network. The networking information is configured for the second device to use to access the target network.

In some embodiments, the first condition includes: the second device failing to access the target network and the failure being due to one of the following reasons: the target network being not scanned; and the networking information configured for accessing the target network being wrong.

In some embodiments, the first device interacts with the second device via n management frames. At least one of the n management frames includes a customized field. The n is a positive integer.

The first management frame is the management frame of the at least one management frame and is broadcasted by the first device.

In some embodiments, the second management frame is the management frame of the at least one management frame and is sent from the second device to the first device.

In some embodiments, the customized field includes at least one information element. The first information element of the at least one information element includes at least one of the following sub-fields: the tag number sub-field configured to identify the customized field; the length sub-field configured to identify the length of the first information element; the organizationally unique identifier sub-field configured to identify the format standard of the first information element; and the data sub-field configured to describe the content information of the layer 2 information; and the data-type sub-field configured to identify the type of the layer 2 information.

In some embodiments, the layer 2 information carried in the first management frame is the device discovery request. The type of the first management frame includes: the action frame or the probe frame. The value of the data-type sub-field corresponding to the device discovery request is the first value. The data sub-field corresponding to the device discovery request carries the capability information of the first device.

In some embodiments, the capability information of the first device includes: the first capability information for describing the network-configure capability or the password-synchronization capability of the first device.

In some embodiments, the layer 2 information carried in the second management frame is the synchronization request. The type of the second management frame includes: the action frame or the probe frame. The value of the data-type sub-field corresponding to the synchronization request is the second value, and the data sub-field corresponding to the synchronization request carries the networking information of the target network.

In some embodiments, the channel over which the second management frame is sent is the first channel. The first channel is the channel that is used to receive the first management frame. In some embodiments, the second receiving module 1301 is further configured for receiving the third management frame broadcasted by the first device.

The networking information of the target network is carried in the customized field of the third management frame, and the third management frame is one of the at least one management frame and is broadcasted by the first device.

In some embodiments, the channel over which the third management frame is received is the second channel. The second channel is the operating channel of the target network. The channel indication information is carried in the data sub-field in the customized field of the first management frame. The channel indication information is configured to indicate the second channel.

In some embodiments, the layer 2 information carried in the third management frame is the synchronization answer. The type of the third management frame includes: the action frame or the probe frame. The value of the data-type sub-field corresponding to the synchronization answer is the third value. The networking information of the target network is carried in the data sub-field corresponding to the synchronization answer.

In some embodiments, the data sub-field in the customized field of the second management frame carries the family information of the second device, and the family information of the second device is configured to be used by the first device to determine whether the second device is the valid user of the first family group. The first family group is the family group to which the first device belongs.

In some embodiments, the electronic device 1300 further includes a second verification module and an access module. The second verification module is configured for, when the data sub-field in the customized field of the third management frame carries the family information of the first device, determining, based on the family information of the first device, whether the first device is the valid user of the second family group. The second family group is the family group to which the second device belongs.

The access module is configured for, in response to the first device being the valid user of the second family group, accessing the target network through the networking information.

It should be noted that, each unit included in the electronic device provided by embodiments of the present application can be implemented by a processor in the electronic device, and of course can also be implemented by a specific logic circuit. During a process of implementation, the processor may be a central processing unit (CPU), a microprocessor unit (MPU), a digital signal processor (DSP) or a field-programmable gate array (FPGA), etc.

The above description of the device embodiments is similar to the description of the above-mentioned method embodiments, and has similar beneficial effects as the method embodiments. For technical details not disclosed in the device embodiments of the present applications, understanding thereof can be obtained by referring to the description of the method embodiments of the present applications.

It should be noted that, in the present application embodiment, if the above-mentioned information processing method is implemented in the form of a software function module and sold or used as a separate product, the software function module may also be stored in a computer-readable storage medium. With this in mind, the technical solutions of the embodiments of the present application in essence or its parts that contribute to the art may be embodied in the form of a software product. The computer software product may be stored in a storage medium and include several instructions to make a computer device (which may be a personal computer, a server, or a network device etc.) to execute all or parts of the method described in various embodiments of the present application. The afore-mentioned storage medium includes various mediums that are capable of storing program codes, such as: a USB flash drive, a removable hard disk, a read only memory (ROM), a diskette or a CD-ROM. In this way, the embodiments of the present application are not limited to any particular combination of hardware and software.

Accordingly, embodiments of the present application provide an electronic device including a memory and a processor. The memory stores a computer program that can be executed on the processor. The processor, when executing the program, performs the operations of the information processing method provided in the above-mentioned embodiments. The electronic device may be the first device or the second device.

Accordingly, embodiments of the present application provide a storage medium, also known as a computer-readable storage medium, in which the computer program is stored. When being executed by the processor, the computer program implements the information processing method provided in the above-mentioned embodiments.

It should be noted that, the description of the above-mentioned storage medium and device embodiment is similar to the description of the above-mentioned method embodiments, and has similar beneficial effects as that of the method embodiments. For technical details not disclosed in the storage medium and device embodiments of the present application, please refer to the description of the method embodiments of the present application for understanding.

Figure 14:
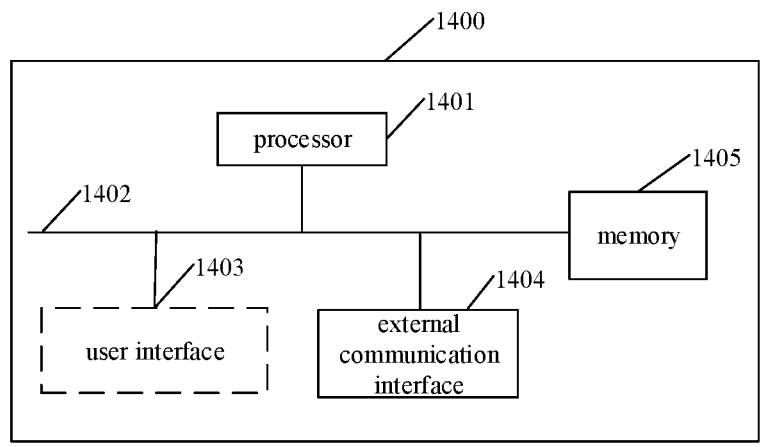
FIG. 14 is a schematic diagram of an optional structure of an electronic device provided according to an embodiment of the present application.

It should be noted that, FIG. 14 is a schematic diagram of a hardware entity of an electronic device (the first device or the second device) according to an embodiment of the present application. As illustrated in FIG. 14, the electronic device 1400 includes a processor 1401, at least one communication bus 1402, at least one external communication interface 1404 and a memory 1405. The communication bus 1402 is configured to enable a connecting communication between these components. In one example, the electronic device 1400 further includes a user interface 1403. The user interface 1403 may include a display screen. The external communication interface 1404 may include a standard wired interface and a wireless interface.

The memory 1405 is configured to store instructions and applications executable by the processor 1401. The memory 1405 may also cache data (e.g., image data, audio data, voice communication data and video communication data) to be processed or that has been processed by the processor 1401 and modules in the electronic device, either through a flash memory (FLASH) or a random-access memory (RAM).

Figure 15:
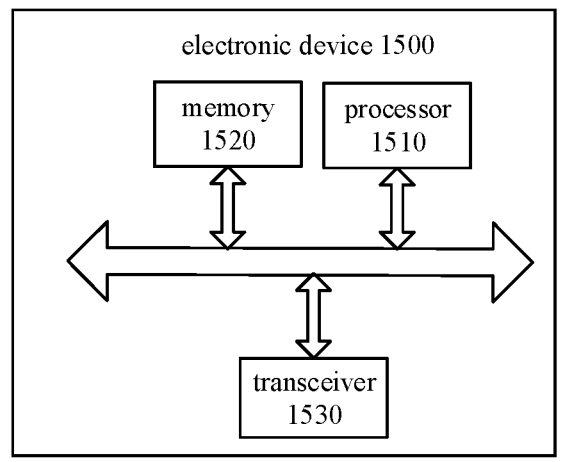
FIG. 15 is a schematic structural diagram of an electronic device provided according to an embodiment of the present application.

FIG. 15 is a schematic structural diagram of an electronic device 1500 provided according to an embodiment of the present application. The electronic device may be the first device or the second device. The electronic device 1500 illustrated in FIG. 15 includes a processor 1510. The processor 1510 may call and execute a computer program from the memory to implement the method in embodiments of the present application.

Alternatively, as illustrated in FIG. 15, the electronic device 1500 may further include a memory 1520. The processors 1510 may call and execute the computer program from the memory 1520 to implement the method in embodiments of the present application.

The memory 1520 may be a separate component from the processor 1510 or may be integrated in the processor 1510.

Alternatively, as illustrated in FIG. 15, the electronic device 1500 may also include a transceiver 1530. The processor 1510 may control the transceiver 1530 to communicate with other devices, specifically, to send information or data to, or receive information or data from, other devices.

Among other things, the transceiver 1530 may include a transmitter and a receiver. The transceiver 1530 may further include an antenna. The number of antennas may be one or more.

Alternatively, the electronic device 1500 may specifically be the network device in embodiments of the present application, and the electronic device 1500 may implement the corresponding processes implemented by the network device in various methods of embodiments of the present application, which will not be described in detail here for the sake of brevity.

Alternatively, the electronic device 1500 may be specifically the mobile terminal/terminal device of embodiments of the present application, and the electronic device 1500 may implement the corresponding processes implemented by the mobile terminal/terminal device in each of the methods of embodiments of the present application, which will not be described here for the sake of brevity.

Figure 16:
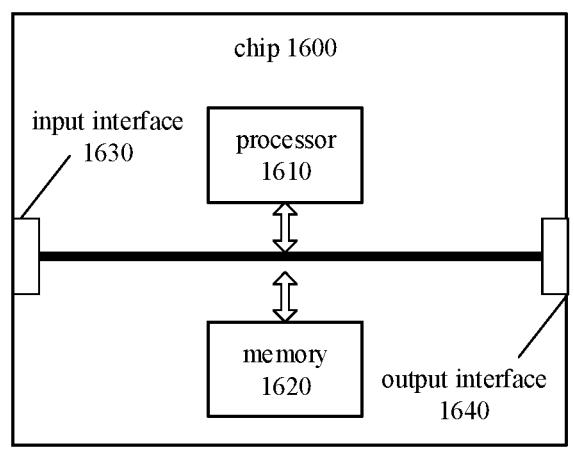
FIG. 16 is a schematic structural diagram of a chip according to an embodiment of the present application.

FIG. 16 is a schematic structural diagram of a chip according to an embodiment of the present application. The chip 1600 illustrated in FIG. 16 includes a processor 1610. The processor 1610 may call and execute a computer program from a memory to implement the method in embodiments of the present application.

Alternatively, as illustrated in FIG. 16, the chip 1600 may further include a memory 1620. The processor 1610 may call and execute the computer program from the memory 1620 to implement the methods in embodiments of the present application.

The memory 1620 may be a separate component from the processor 1610 or may be integrated in the processor 1610.

Alternatively, the chip 1600 may further include an input interface 1630. The processor 1610 may control the input interface 1630 to communicate with other devices or chips, specifically, to obtain information or data sent from other devices or chips.

Alternatively, the chip 1600 may further include an output interface 1640. The processor 1610 may control the output interface 840 to communicate with other devices or chips, specifically, to output information or data to other devices or chips.

Alternatively, the chip may be applied to the network device in embodiments of the present application, and the chip may implement the corresponding processes implemented by the network device in various methods of embodiments of the present application, which will not be described in detail here for the sake of brevity.

Alternatively, the chip can be applied to the mobile terminal/terminal device in embodiments of the present application, and the chip can implement the corresponding processes implemented by the mobile terminal/terminal device in each method of embodiments of the present application, which will not be repeated in detail here for the sake of brevity.

It should be understood that, the chip mentioned in embodiments of the present application may also be referred to as a system-on-chip, a system-on-a-chip, a System on Chip or an SOC etc.

Figure 17:
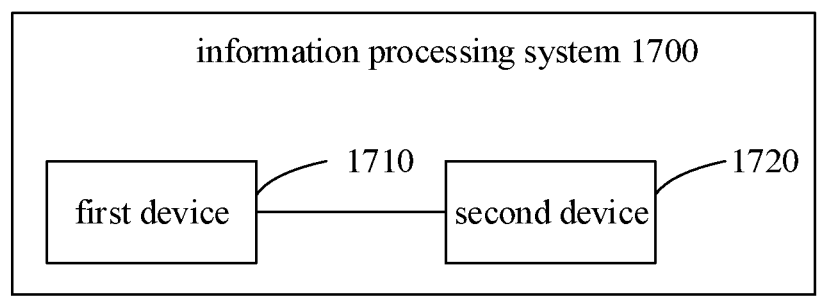
FIG. 17 is a schematic block diagram of an information processing system provided according to an embodiment of the present disclosure.

FIG. 17 is a schematic block diagram of an information processing system 1700 provided according to an embodiment of the present disclosure. As illustrated in FIG. 17, the information processing system 1700 includes a first device 1710 and a second device 1720.

The first device 1710 is configured to implement the corresponding function of the above-mentioned method that is implemented by the first device. The second device 1720 is configured to implement the corresponding function of the above-mentioned method that is implemented by the second device. For the sake of brevity, the details are not repeated here.

It should be appreciated that, the processor of embodiments of the present application may be a kind of integrated circuit chip, which is capable of processing signals. During implementation, each operation of the above-mentioned method embodiments may be accomplished by an integrated logic circuitry of a hardware of the processor or an instruction in software-form. The above-mentioned processor may be a General-Purpose Processor, a Digital Signal Processor (DSP), an Application Specific Integrated Circuit (ASIC), a Field Programmable Gate Array (FPGA) or other programmable logic device, a discrete gate or a transistor logic device and a discrete hardware component. The processor may realize or implement various methods, steps or logical block diagrams disclosed in embodiments of the present disclosure. The general-purpose processor may be a microprocessor or the processor may also be any kind of conventional processors, etc. The steps of methods disclosed in conjunction with embodiments of the present disclosure may be performed directly by the hardware decoding processor, or by a combination of hardware and software modules in the decoding processor. The software module may be located in a random memory, a flash memory, a read-only memory, a programmable read-only memory or an electrically erasable and programmable memory, a register and other storage medium proven in the field. The storage medium is located in the memory. The processor may read the information in the memory and complete the steps of the above-mentioned method in combination with its hardware.

It should be appreciated that, a reference to "an embodiment" or "embodiments" throughout the specification means that a particular feature, structure or characteristic described in conjunction with the embodiment is included in at least one embodiment of the present application. Therefore, the phrase "in one embodiment" or "in some embodiments" found throughout the specification does not necessarily refer to the same embodiment. In addition, these particular features, structures or characteristics may be combined in one or more embodiments in any appropriate manner. It should be appreciated that, in various embodiments of the present application, the order of the sequence numbers of the various processes described above does not imply the sequence of execution, and the sequence of execution of the processes should be determined by their function and inherent logic, and should not constitute any limitation on the processes implemented in the embodiments of the present application. The above sequence numbers of the embodiments of the present application are for the purpose of description only, and do not represent the advantages or disadvantages of the embodiments.

It should be noted that, in the present disclosure, the terms "including", "comprising", or any other variation thereof are intended to cover non-exclusive inclusion, such that a process, a method, an article or an apparatus including a set of elements includes not only those elements, but also other elements not explicitly listed, or elements inherent to such a process, a method, an article or an apparatus. Without further limitation, an element defined by the statement "including a . . . " does not preclude the existence of another identical element in the process, method, article or apparatus that includes that element.

In embodiments provided in the present application, it should be understood that the disclosed device and method may be embodied in other ways. The device embodiments described above are merely illustrative. For example, the division of units is only a logical function division, and there may be other division manners in actual implementations. For example, multiple units or components may be combined or integrated into another system, or some features may be ignored or not implemented. In addition, the couplings, direct couplings or communication connections between the components illustrated or discussed may be indirect couplings or communication connections through some interfaces, devices or units, and may be electrical, mechanical or of other forms.

The units described above as separate components may or may not be physically separate. The component displayed as a unit may or may not be a physical unit. That is, it may be located in one place or distributed in multiple network units. Some or all of the units may be selected according to actual requirements to achieve the object of the solution of the present embodiment. In addition, the functional units in embodiments of the present application may all be integrated into a processing unit, or each unit may be individually used as a unit, or two or more units may be integrated into one unit. The above-mentioned integrated units may be realized in the form of hardware, or in the form of hardware plus software functional units.

Those of ordinary skills in the art should understand that, all or a part of the operations of the above method embodiments may be implemented by a hardware relating to a program instruction. The above-mentioned program may be stored in a non-transitory computer-readable storage medium. When the program is executed, it may execute the operations of the above-mentioned method embodiments. The afore-mentioned storage medium includes: a removable storage device, a Read Only Memory (ROM), a magnetic disk or a CD and other mediums that could store program codes.

Alternatively, in the present application, if the above-mentioned integrated unit is implemented in the form of a software function module and sold or used as a separate product, it may also be stored in a computer-readable storage medium. With this in mind, the technical solutions of the embodiments of the present application in essence or its parts that contribute to the art may be embodied in the form of a software product. The computer software product may be stored in a storage medium and include several instructions to make a computer device (which may be a personal computer, a server, or a network device etc.) to execute all or parts of the method described in various embodiments of the present application. The afore-mentioned storage medium may include: a removable storage device, an ROM, a magnetic disk or a CD and other mediums that could store program instructions.

The above are only specific implementations of the present application, and the protection scope of the present application is not limited thereto. Changes or alternations within the technical scope of the present application could easily occur to those skilled in the art and should be considered to be within the protection scope of the present application. Therefore, the protection scope of the present application should be subject to the appended claims.

What is claimed is:

1. An information processing method, performed by a first device, and comprising:

broadcasting a first management frame, wherein the first management frame is configured to discover a second device failing to access a network; and receiving a second management frame sent by the second device, wherein the second management frame is configured to indicate that the second device requests networking information of a target network, the networking information is configured for the second device to use to access the target network.

2. The method as claimed in claim 1, wherein the first device interacts with the second device via n management frames, at least one of the n management frames comprises a customized field, the n is a positive integer; and the first management frame is a management frame of the at least one management frame and is broadcasted by the first device; or, the second management frame is a management frame of the at least one management frame and is sent from the second device to the first device.

3. The method as claimed in claim 2, wherein the customized field comprises at least one information element, a first information element of the at least one information element comprises at least one of the following sub-fields:

a tag number sub-field, configured to identify the customized field;

a length sub-field, configured to identify a length of the first information element;

an organizationally unique identifier sub-field, configured to identify a format standard of the first information element;

a data sub-field, configured to describe content information of layer 2 information; and a data-type sub-field, configured to identify a type of the layer 2 information.

4. The method as claimed in claim 3, wherein the layer 2 information carried in the first management frame is a device discovery request; a type of the first management frame comprises: an action frame or a probe frame; a value of the data-type sub-field corresponding to the device discovery request is a first value, and the data sub-field corresponding to the device discovery request carries capability information of the first device, wherein, the capability information of the first device comprises: a first capability information for describing a network-configure capability or a password-synchronization capability of the first device.

5. The method as claimed in claim 3, wherein the layer 2 information carried in the second management frame is a synchronization request, a type of the second management frame comprises: an action frame or a probe frame; a value of the data-type sub-field corresponding to the synchronization request is a second value, and the data sub-field corresponding to the synchronization request carries family information of the second device.

6. The method as claimed in claim 1, wherein a channel over which the second management frame is received is a first channel, the first channel is a channel that is used by the second device to receive the first management frame.

7. The method as claimed in claim 3, further comprising:

broadcasting a third management frame, wherein, the networking information of the target network is carried in a customized field of the third management frame, and the third management frame is a management frame of the at least one management frame and is broadcasted by the first device.

8. The method as claimed in claim 7, wherein a data sub-field in a customized field of the second management frame carries a family information of the second device;

before broadcasting the third management frame, the method further comprises:

determining, based on the family information of the second device, whether the second device is a valid user of a first family group, the first family group being a family group to which the first device belongs; and broadcasting, in response to the second device being the valid user of the first family group, the third management frame.

9. The method as claimed in claim 7, wherein a data sub-field in the customized field of the third management frame carries a family information of the first device, and the family information of the first device is configured to be used by the second device to determine whether the first device is a valid user of a second family group, the second family group is a family group to which the second device belongs.

10. An information processing method, performed by a second device, and comprising:

receiving, in response to the second device satisfying a first condition, a first management frame broadcasted by a first device, wherein, the first management frame is configured for discovering the second device failing to access a network, the second device satisfying the first condition represents that the second device has failed to access the network; and sending a second management frame to the first device, wherein, the second management frame is configured to indicate that the second device requests networking information of a target network, the networking information is configured for the second device to use to access the target network.

11. The method as claimed in claim 10, wherein the first condition comprises: the second device failing to access the network, and a reason for the failure comprising one of the following reasons:

the second device having not scanned the network; and networking information for accessing the network being wrong.

12. The method as claimed in claim 10, wherein the first device interacts with the second device via n management frames, at least one of the n management frames comprises a customized field, the n is a positive integer; and the first management frame is a management frame of the at least one management frame and is broadcasted by the first device; or the second management frame is a management frame of the at least one management frame and is sent from the second device to the first device.

13. The method as claimed in claim 12, wherein the customized field comprises at least one information element, a first information element of the at least one information element comprises at least one of the following sub-fields:

a tag number sub-field, configured to identify the customized field;

a length sub-field, configured to identify a length of the first information element;

an organizationally unique identifier sub-field, configured to identify a format standard of the first information element;
a data sub-field, configured to describe content information of layer 2 information; and
a data-type sub-field, configured to identify a type of the layer 2 information.

14. The method as claimed in claim 13, wherein
the layer 2 information carried in the first management frame is a device discovery request;
a type of the first management frame includes: an action frame or a probe frame;
a value of the data-type sub-field corresponding to the device discovery request is a first value; and
a data sub-field corresponding to the device discovery request carries capability information of the first device,
wherein, the capability information of the first device comprises: a first capability information for describing a network-configure capability or a password-synchronization capability of the first device.

15. The method as claimed in claim 13, wherein
the layer 2 information carried in the second management frame is a synchronization request;
a type of the second management frame comprises: an action frame or a probe frame;
a value of the data-type sub-field corresponding to the synchronization request is a second value; and
a data sub-field corresponding to the synchronization request carries networking information of the target network.

16. The method as claimed in claim 10, wherein a channel over which the second management frame is received is a first channel; and
the first channel is a channel that is used to receive the first management frame.

17. The method as claimed in claim 13, further comprising:
receiving a third management frame broadcasted by the first device,
wherein, the networking information of the target network is carried in a customized field of the third management frame, and the third management frame is a management frame of the at least one management frame and is broadcasted by the first device.

18. The method as claimed in claim 14, wherein
a data sub-field in a customized field of the second management frame carries family information of the second device,
the family information of the second device is configured to be used by the first device to determine whether the second device is a valid user of a first family group, and the first family group is a family group to which the first device belongs.

19. The method as claimed in claim 14, wherein
in response to a data sub-field in a customized field of the third management frame carrying family information of the first device, the method further comprises:
determining, based on the family information of the first device, whether the first device is a valid user of a second family group, wherein, the second family group is a family group to which the second device belongs; and
accessing, in response to the first device being the valid user of the second family group, the target network through the networking information.

20. An electronic device, comprising a memory, a processor and a computer program stored in the memory and executable on the processor,
in response to the electronic device being a first device, the processor, when executing the computer program, implements operations in an information processing method comprising:
broadcasting a first management frame, wherein the first management frame is configured to discover a second device failing to access a network; and
receiving a second management frame sent by the second device, wherein the second management frame is configured to indicate that the second device requests networking information of a target network, the networking information is configured for the second device to use to access the target network; or
in response to the electronic device being the second device, the processor, when executing the computer program, implements operations in an information processing method comprising:
receiving, in response to the second device satisfying a first condition, the first management frame broadcasted by the first device, wherein, the first management frame is configured for discovering the second device failing to access the network, the second device satisfying the first condition represents that the second device has failed to access the target network; and
sending the second management frame to the first device, wherein, the second management frame is configured to indicate that the second device requests networking information of the target network, the networking information is configured for the second device to use to access the target network.

* * * * *